G. H. McKINNIS & L. E. NEALE.
RESILIENT VEHICLE WHEEL.
APPLICATION FILED MAY 28, 1914.
1,178,327.
Patented Apr. 4, 1916.
2 SHEETS—SHEET 2.
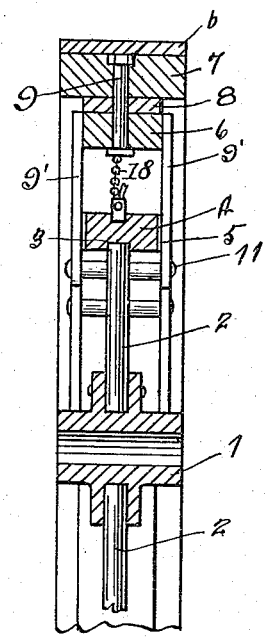
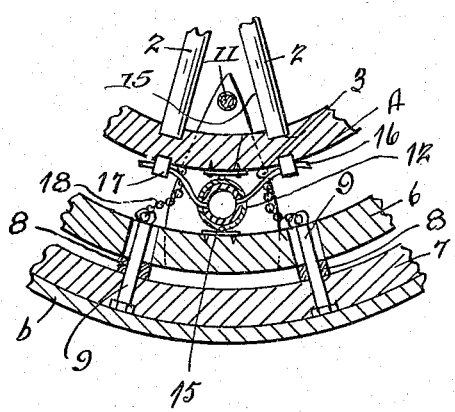
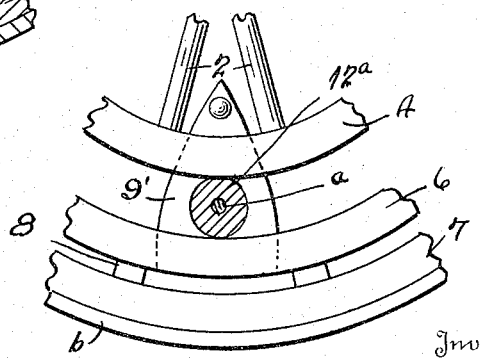
Inventors
G. H. McKinnis
L. E. Neale

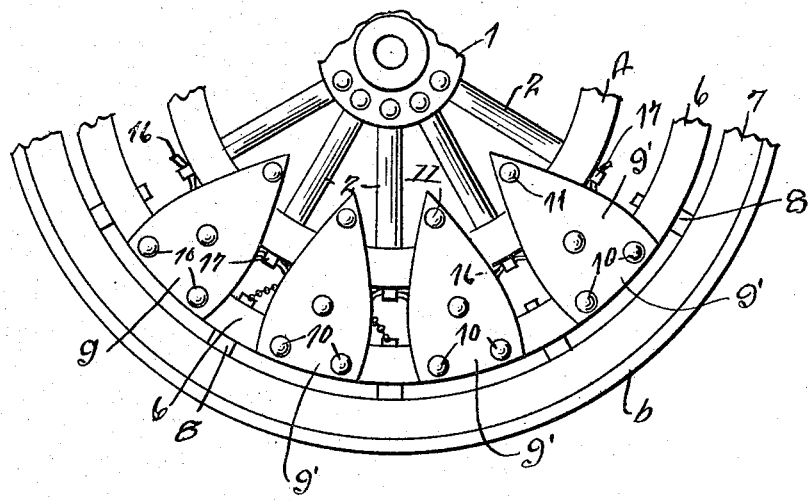
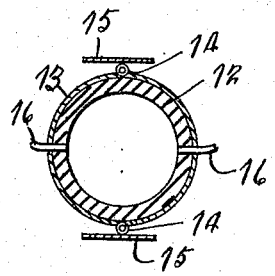
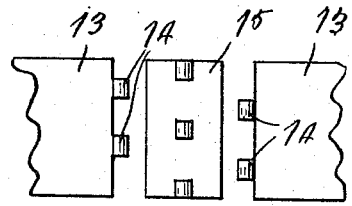

UNITED STATES PATENT OFFICE.

GEORGE H. McKINNIS AND LOUIS E. NEALE, OF WARDNER, IDAHO.

RESILIENT VEHICLE-WHEEL.

1,178,327. Specification of Letters Patent. Patented Apr. 4, 1916.

Application filed May 28, 1914. Serial No. 841,483.

*To all whom it may concern:*

Be it known that we, GEORGE H. McKINNIS and LOUIS E. NEALE, citizens of the United States, residing at Wardner, in the county of Shoshone and State of Idaho, have invented certain new and useful Improvements in Resilient Vehicle-Wheels; and we do hereby declare the following to be a full, clear, and exact description of the invention, such as will enable others skilled in the art to which it appertains to make and use the same.

This invention relates to resilient vehicle wheels, and one of the principal objects of the same is to provide simple and efficient means for reducing the vibrations of the vehicle body due to the unevenness or obstructions in roads, and to absorb the shocks incident to vehicles passing over rough roads.

Another object of the invention is to provide a vehicle wheel in which the resilient elements of the wheel are not brought directly into contact with the road bed, thus adding to the life of the parts and providing a wheel which is not liable to get out of order in use.

These and other objects may be attained by means of the construction illustrated in the accompanying drawings, in which, Figure 1 is a view in side elevation illustrating a portion of the lower part of a wheel made in accordance with this invention, Fig. 2 is a vertical sectional view taken through one-half of the wheel, Fig. 3 is a detail longitudinal sectional view of the outer rim and connected parts, Fig. 4 is a sectional view of a slightly modified form, showing the rims and tire in elevation, Fig. 5 is a detail sectional view of the rubber buffer and hinged plates, and Fig. 6 is a detail view of the hinged plates.

Referring to the drawings, the numeral 1 designates the hub of the wheel and 2 are the spokes. The spokes are connected to the hub in the usual or any suitable manner and at their outer ends the spokes are fitted into recesses or sockets 3 in the rim 4. The opposite sides of the rim 4 are faced with a metal or vulcanized fiber ring 5. Surrounding the rim 4 and spaced therefrom is a rim 6, and the outer felly or rim 7 is spaced from the rim 6 by means of short sections of rubber or other suitable material 8. A bolt 9 extends through the felly or outer rim 7, through the sections 8 and through the rim 6, as shown more clearly in Fig. 2. Side plates 9' are connected by bolts 10 to the rim 6, said side plates extending toward the hub and disposed at opposite sides of the rim 4. The side plates 9' are connected by cross bolts 11 between each pair of spokes 2.

A resilient rubber buffer 12, as shown in Fig. 5, is inclosed within two semi-circular hinged metal members 13, said metal members being hinged upon the pins 14, and connected to a bearing plate 15 at the top and bottom of the same, said bearing plates being secured one to the rim 4 and the other to the rim 6, as shown more clearly in Fig. 3. It is to be understood that the metal members 13 are formed of a relatively thin highly resilient metal which is capable of being readily distorted and will return to its normal condition after having been bent in any direction. The buffer 12 may be in the form of a hollow ball filled with air under atmospheric pressure or otherwise, and connected to each of the buffers 12 are tubes 16 which communicate with the interior of the series of balls and lead from the same intermediate the spokes to staples or guides 17 connected to the rim 4. Limiting chains 18 are connected at their opposite ends to the rims 4 and 6.

As shown in Fig. 4, the resilient elements 12$^a$ are in the form of a solid rubber or other resilient cylindrical or ball section, and are secured by means of a bolt $a$ to the plates 9'. This construction eliminates the use of the hinged plates 13, the connecting tubes 16, chains 18, and bearing plates 15. The outer tire $b$ may be of metal or of any suitable material or form.

From the foregoing it will be obvious that as the wheel passes over the ground the shocks and jars to the vehicle would be entirely absorbed by the resilient action of the elements 12 or 12$^a$, and in the case of the resilient elements 12 the air would be forced therefrom through the tubes 16 at the bottom of the wheel and will return as the wheel rotates, thus providing a compensating air cushion which cannot be punctured and which will absorb the ordinary jars and shocks incident to the travel of vehicles of the heavier or lighter character.

Various changes may be made in the details of construction without departing from the spirit and scope of the invention as defined in the claims.

What is claimed is:—

1. A resilient wheel comprising a hub, spokes, an inner rim, to which the spokes are connected, spacing plates at the sides of said rims, two outer rims having interposed rubber blocks, an outer tire, and resilient elements disposed between the inner rim and the next adjacent rim, said resilient elements being hollow and tubes connecting the entire series of elements around the wheel, and means for limiting the movement of the inner and next adjacent rims one relatively to the other.

2. A resilient wheel comprising a hub, spokes, an inner rim, spacing plates at the sides of said rim, an outer rim, said outer rim being formed of two annular members spaced from each other by resilient blocks, resilient elements disposed between the inner rim and the outer rim, said resilient elements being hollow, tubes connecting the elements with each other in series around the wheel and chains limiting the movement of the inner and outer rims respectively.

In testimony whereof we affix our signatures in presence of two witnesses.

GEORGE H. McKINNIS.
LOUIS E. NEALE.

Witnesses:
C. O. POLLARD,
J. E. JONES.